US011172385B2

(12) United States Patent
Basu Mallick et al.

(10) Patent No.: US 11,172,385 B2
(45) Date of Patent: Nov. 9, 2021

(54) BEAM RECOVERY PROCEDURE

(71) Applicant: Lenovo (Singapore) PTE. LTD., New Tech Park (SG)

(72) Inventors: Prateek Basu Mallick, Langen (DE); Joachim Loehr, Wisebaden (DE); Hyejung Jung, Palatine, IL (US); Alexander Johann Maria Golitschek Edler von Elbwart, Darmstadt (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 257 days.

(21) Appl. No.: 16/234,172

(22) Filed: Dec. 27, 2018

(65) Prior Publication Data
US 2019/0200248 A1 Jun. 27, 2019

Related U.S. Application Data

(60) Provisional application No. 62/610,916, filed on Dec. 27, 2017.

(51) Int. Cl.
*H04W 24/04* (2009.01)
*H04L 12/24* (2006.01)
(Continued)

(52) U.S. Cl.
CPC .......... *H04W 24/04* (2013.01); *H04B 7/0695* (2013.01); *H04B 7/088* (2013.01); *H04L 41/0672* (2013.01); *H04L 41/0816* (2013.01)

(58) Field of Classification Search
CPC ..... H04W 24/04; H04W 36/30; H04W 72/04; H04B 7/0695; H04B 7/088; H04B 7/0408;
(Continued)

(56) References Cited

U.S. PATENT DOCUMENTS

2015/0264580 A1* 9/2015 Iwai ................. H04W 72/0406 370/329
2016/0081108 A1* 3/2016 Tseng ................ H04W 72/0493 370/329
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.2.0, Mar. 2017, pp. 1-330.
(Continued)

*Primary Examiner* — Kibrom T Hailu
(74) *Attorney, Agent, or Firm* — Kunzler Bean & Adamson

(57) ABSTRACT

Apparatuses, methods, and systems are disclosed for the handling of beam failure. One apparatus includes a processor and a transceiver that that communicates with a base unit using a first set of beams. The processor detects beam failure for each beam in the first set of beams and initiates both a beam revival procedure and a beam recovery procedure in parallel. The processor terminates the beam recovery procedure in response to successful beam revival and prior to receiving a beam failure recovery response from the base unit. Additionally, the processor re-starts communication with the base unit using the first set of beams in response to successful beam revival.

20 Claims, 7 Drawing Sheets

(51) Int. Cl.
*H04B 7/08* (2006.01)
*H04B 7/06* (2006.01)

(58) Field of Classification Search
CPC .............. H04B 7/0617; H04L 41/0672; H04L 41/0816
See application file for complete search history.

(56) References Cited

U.S. PATENT DOCUMENTS

| | | | | |
|---|---|---|---|---|
| 2018/0206170 | A1* | 7/2018 | Nagaraja | H04W 36/305 |
| 2018/0323842 | A1* | 11/2018 | Majmundar | H04B 7/022 |
| 2019/0053293 | A1* | 2/2019 | Akoum | H04W 72/042 |
| 2019/0058629 | A1* | 2/2019 | Akoum | H04W 56/001 |
| 2019/0159154 | A1* | 5/2019 | Kim | H04W 56/001 |
| 2019/0387551 | A1* | 12/2019 | Liu | H04L 5/0016 |
| 2020/0037332 | A1* | 1/2020 | da Silva | H04L 5/0023 |
| 2020/0084820 | A1* | 3/2020 | Wiberg | H04W 76/00 |
| 2020/0374921 | A1* | 11/2020 | Li | H04W 8/26 |

OTHER PUBLICATIONS

3GPP, "3rd Generation Partnership Project; Technical Specification Group Radio Access Network; NR; Medium Access Control (MAC) protocol specification (Release 15)" 3GPP TS 38.321 V1.1.0, Nov. 2017, pp. 1-64.
Media Tek Inc., "Offline summary on remaining issues on Beam Failure Recovery", 3GPP TSG RAN WG1 Meeting #91 R1-1721645, Nov. 27-Dec. 1, 2017, pp. 1-21.
3GPP, "3rd Generation Partnership Project; Technical Specification Group Radio Access Network; NR; Physical layer procedures for control (Release 15)", 3GPP TS 38.213 V1.0.1, Sep. 2017, pp. 1-26.
3GPP, "3rd Generation Partnership Project; Technical Specification Group Radio Access Network; NR; Physical layer procedures for data (Release 15)", 3GPP TS 38.214 V1.2.0, Nov. 2017, pp. 1-54.
3GPP, "3rd Generation Partnership Project; Technical Specification Group Radio Access Network NR Radio Resource Control (RRC) Protocol specification (Release 15)", 3GPP TS 38.331 V0.4.0, Dec. 2017, pp. 1-187.
3GPP, "3rd Generation Partnership Project; Technical Specification Group Radio Access Network; New Radio(NR); Requirements for support of radio resource management (Release 15)", 3GPP TS 38.133 V0.3.0, Nov. 2017, pp. 1-25.
"3rd Generation Partnership Project; Technical Specification Group Radio Access Network; Evolved Universal Terrestrial Radio Access (E-UTRA); Radio Resource Control (RRC); Protocol Specification", 3GPP TS 36.331 V14.2.0, Mar. 2017, pp. 1-721.
"LTE; Evolved Universal Terrestrial Radio Access (E-UTRA); Physical Layer; Measurements", 3GPP TS 36.321 Version 14.2.0 Release 14, Apr. 2017, pp. 1-7.
"Evolved Universal Terrestrial Radio Access (E-UTRA) and Evolved Universal Terrestrial Radio Access Network (E-UTRAN); Overall Description; Stage 2", 3GPP TS 36.300 Version 14.2.0 Release 14, Apr. 2017, pp. 1-346.
PCT/IB2018/001589, "Notification of Transmittal of the International Search Report and the Written Opinion of the International Searchinig Authority, or the Declaration", International Searching Authority, May 20, 2019, pp. 1-12.
Vivo, "Beam recovery based on NR-PDCCH and NR-PDSCH", 3GPP TSG RAN WG1 Meeting #89, R1-1707245, May 15-29, 2017, pp. 1-6.
Institute for Information Industry (III), "Discussion on beam failure recovery mechanism", 3GPP TSG-RAN WG1 Meeting #89, R1-1708874, May 15-19, 2017, pp. 1-4.
Nokia, Alcatel-Lucent Shanghai Bell, "Beam Recovery", 3GPP TSG RAN WG1 NR Ad-Hoc#2, R1-1711291, Jun. 27-30, 2017, pp. 1-7.
Huawei, Hisilicon, "Beam Failure Recovery Design Details", 3GPP TSG RAN WG1 Meeting AH NR#3, R1-1715468, Sep. 18-21, 2017, pp. 1-10.

\* cited by examiner

BEAM RECOVERY PROCEDURE

CROSS-REFERENCE TO RELATED APPLICATIONS

This application claims priority to U.S. Provisional Patent Application No. 62/610,916 entitled "Efficient Recovery from Beam Failure" and filed on Dec. 27, 2017 for Prateek Basu Mallick, Joachim Löhr, Hyejung Jung and Alexander Johann Maria Golitschek Edler von Elbwart, which is incorporated herein by reference.

FIELD

The subject matter disclosed herein relates generally to wireless communications and more particularly relates to the handling of beam failure at a UE.

BACKGROUND

The following abbreviations are herewith defined, at least some of which are referred to within the following description.

The following abbreviations are herewith defined, at least some of which are referred to within the following description: Third Generation Partnership Project ("3GPP"), Fifth-Generation Core ("5GC"), Access and Mobility Management Function ("AMF"), Access Point Name ("APN"), Access Stratum ("AS"), Bandwidth Adaptation ("BA"), Bandwidth Part ("BWP"), Beam Failure Detection ("BFD"), Beam Failure Recovery Request ("BFRR"), Binary Phase Shift Keying ("BPSK"), Buffer Status Report ("BSR"), Block Error Rate ("BLER"), Carrier Aggregation ("CA"), Cell-Specific Radio Network Temporary Identifier ("C-RNTI"), Clear Channel Assessment ("CCA"), Cyclic Prefix ("CP"), Control Element ("CE"), Cyclical Redundancy Check ("CRC"), Channel State Information ("CSI"), Common Search Space ("CSS"), Data Radio Bearer ("DRB," e.g., carrying user plane data), Demodulation Reference Signal ("DM-RS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Licensed Assisted Access ("eLAA"), Enhanced Mobile Broadband ("eMBB"), Evolved Node B ("eNB"), Evolved Packet Core ("EPC"), Evolved UMTS Terrestrial Radio Access Network ("E-UTRAN"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), General Packet Radio Service ("GPRS"), Global System for Mobile Communications ("GSM"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Logical Channel ("LCH"), Long Term Evolution ("LTE"), Multiple Access ("MA"), Medium Access Control ("MAC"), Master Cell Group ("MCG"), Modulation Coding Scheme ("MCS"), Machine Type Communication ("MTC"), Mobility management Entity ("MME"), Multiple Input Multiple Output ("MIMO"), Multi User Shared Access ("MUSA"), Narrowband ("NB"), Next Generation (e.g., 5G) Node-B ("gNB"), Next Generation Radio Access Network ("NG-RAN"), New Radio ("NR", e.g., 5G radio access), New Data Indicator ("NDP"), Non-Orthogonal Multiple Access ("NOMA"), Orthogonal Frequency Division Multiplexing ("OFDM"), Packet Data Convergence Protocol ("PDCP"), Primary Cell ("PCell"), Physical Broadcast Channel ("PBCH"), Packet Data Network ("PDN"), Protocol Data Unit ("PDU"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Link Control ("RLC"), Radio Link Failure ("RLF"), Radio Link Monitoring ("RLM"), Radio Resource Control ("RRC"), Random-Access Procedure ("RACH"), Random Access Response ("RAR"), Radio Network Temporary Identifier ("RNTI"), Reference Signal ("RS"), Reference Signal Received Power ("RSRP"), Remaining Minimum System Information ("RMSI"), Resource Block Assignment ("RBA"), Resource Spread Multiple Access ("RSMA"), Round Trip Time ("RTT"), Receive ("RX"), Sparse Code Multiple Access ("SCMA"), Scheduling Request ("SR"), Signaling Radio Bearer ("SRB," e.g., carrying control plane data), Single Carrier Frequency Division Multiple Access ("SC-FDMA"), Secondary Cell ("SCell"), Secondary Cell Group ("SCG"), Shared Channel ("SCH"), Signal-to-Interference-Plus-Noise Ratio ("SINR"), Serving Gateway ("SGW"), Service Data Unit ("SDU"), Sequence Number ("SN"), Session Management Function ("SMF"), System Information Block ("SIB"), Synchronization Signal ("SS"), Transport Block ("TB"), Transport Block Size ("TB S"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("the UE"), Uplink ("UL"), User Plane ("UP"), Universal Mobile Telecommunications System ("UMTS"), Uplink Pilot Time Slot ("UpPTS"), Ultra-reliability and Low-latency Communications ("URLLC"), Wireless Local Area Network ("WLAN"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In 5G mobile communication networks, two physical layer procedures, namely, Radio Link Monitoring ("RLM") procedure and Link Reconfiguration ("LR") procedure, ensure that a UE is latched on to the best cell and the best beam(s) of this cell. The RLM procedure is adopted from that used in LTE (e.g., 4G mobile communication network). Under LR procedure, a Beam Failure occurs when the BLERs of hypothetical PDCCH associated with the configured RS types is above a threshold.

BRIEF SUMMARY

Methods for the handling of beam failure at a UE are disclosed. Apparatuses and systems also perform the functions of the methods.

One method (e.g., of a UE) for the handling of beam failure at a UE includes communicating with a base unit using a first set of beams and detecting beam failure for each beam in the first set of beams. The first method includes initiating a beam revival procedure in parallel with a beam recovery procedure. Here, the beam recovery procedure comprises transmitting a BFRR. The method includes terminating the beam recovery procedure in response to successful beam revival of at least one beam in the first set and prior to receiving a BFRR response from the base unit and re-starting communication with the base unit using the first set of beams in response to successful beam revival of at least one beam in the first set.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
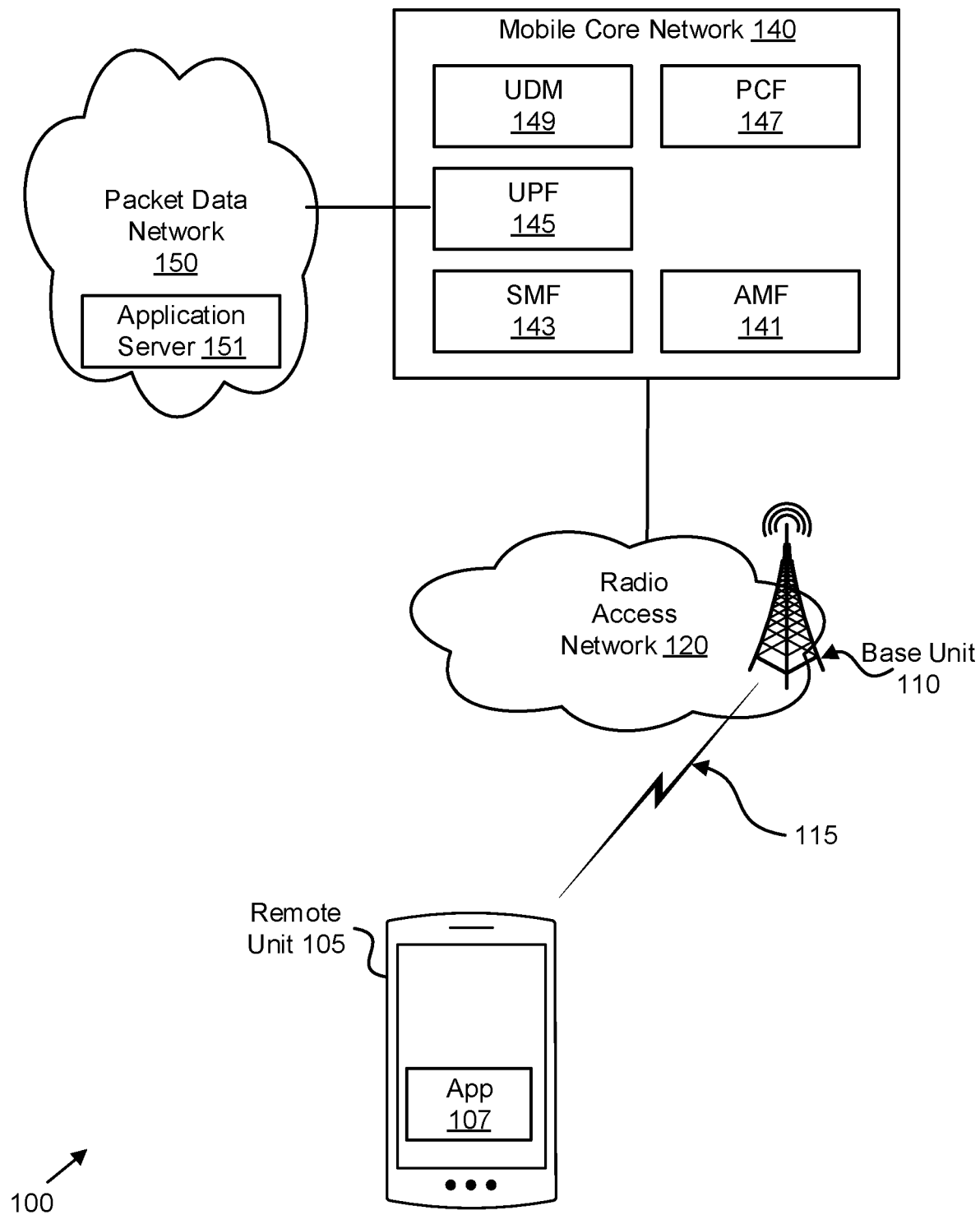
FIG. 1 is a schematic block diagram illustrating one embodiment of a wireless communication system for efficiently recovering from beam failure.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

With 5G NR, two physical layer procedures, namely, Radio Link Monitoring ("RLM") procedure and Link Reconfiguration ("LR") procedure ensures that the UE is latched on to the best cell and beam(s) of this cell. By ensuring the quality of connected cell and beam(s) the data transmissions and reception towards the UE may be optimized both when the UE is static and also when it is mobile, and its radio channel situation changes quite drastically even because of the slightest movement of the UE. The first procedure, RLM is already been used in LTE (the 4th generation wireless System) and is rather stable. The second procedure, Link Reconfiguration, leads to Beam Management, Beam Failure, and Recovery from Beam Failure. Currently, these LR procedures are still being developed and there are some uncertainties, as will be discussed later after an introduction of the related procedure.

Regarding the Radio Link Monitoring procedure, the downlink radio link quality of the Primary Cell ("PCell") is monitored by a UE for the purpose of indicating Out-of-Sync/In-Sync status to higher layers. The UE is not required to monitor the downlink radio link quality in DL BWPs other than the active DL BWP on the PCell.

If the UE is configured with a Secondary Cell Group ("SCG") and the parameter rlf-TimersAndConstantsSCG is provided by the higher layers and is not set to release, the downlink radio link quality of the Primary Secondary Cell ("PSCell") of the SCG is monitored by the UE for the purpose of indicating Out-of-Sync/In-Sync status to higher layers. Note that Out-of-Sync indications are used to communicate physical layer problems to higher layers and In-Sync indications are used to communicate physical layer recovery to the higher layers.

A UE may be configured for each special cell ("SpCell") with a set of resource indexes for radio link monitoring by higher layer parameter RLM-RS-List. The UE is provided by higher layer parameter RLM-RS an association between a resource index, from the set of resource indexes, with either a CSI-RS resource configuration or a SS/PBCH block. For a CSI-RS resource configuration, the UE is provided a corresponding index by higher layer parameter RLM-CSIRS. For a SS/PBCH block, the UE is provided a corresponding index by higher layer parameter RIM-SSB.

In non-DRX mode operation, the physical layer in the UE assess the radio link quality, evaluated over the previous time period against thresholds ($Q_{out}$ and $Q_{in}$) configured by higher layer parameter RLM-IS-OOS-thresholdConfig. In DRX mode operation, the physical layer in the UE assesses the radio link quality, for example, evaluated over a pre-defined previous time period, against thresholds ($Q_{out}$ and $Q_{in}$).

The physical layer in the UE, in frames where the radio link quality is assessed, sends an Out-of-Sync indication to higher layers when the radio link quality is worse than the threshold $Q_{out}$ for all resources in the set of resources for radio link monitoring. When the radio link quality is better than the threshold $Q_{in}$ for any resource in the set of resources for radio link monitoring, in frames where the radio link quality is assessed, then the physical layer in the UE also sends an In-Sync indication to the higher layers.

Regarding the Link Reconfiguration procedure, a UE may be configured, for a serving cell, with a set $\bar{q}_0$ of periodic CSI-RS resource configuration indexes by a first higher layer parameter, e.g., Beam-Failure-Detection-RS-ResourceConfig, and with a set $\bar{q}_1$ of CSI-RS resource configuration indexes and/or SS/PBCH block indexes by another higher layer parameter, e.g., Candidate-Beam-RS-List, for radio link quality measurements on the serving cell.

In certain embodiments, the UE is not provided with the first higher layer parameter, e.g., Beam-Failure-Detection-RS-ResourceConfig. In such embodiments, the UE may determine $\bar{q}_0$ to include SS/PBCH blocks and periodic CSI-RS configurations with same values for higher layer parameter TCI-StatesPDCCH as for control resource sets ("CORESETs") with which the UE is configured for monitoring PDCCH.

The physical layer in the UE assesses the radio link quality according to the set $\bar{q}_0$ of resource configurations against the threshold $Q_{out,LR}$. The threshold $Q_{out,LR}$ corresponds to the default value of higher layer parameter RLM-IS-OOS-thresholdConfig and Beam-failure-candidate-beam-threshold, respectively. For the set $\bar{q}_0$, the UE assesses the radio link quality according (e.g., only according) to periodic CSI-RS resource configurations or SS/PBCH blocks that are quasi co-located with the DM-RS of PDCCH receptions monitored by the UE. The UE applies the configured $Q_{in,LR}$ threshold for the periodic CSI-RS resource configurations. The UE applies the $Q_{out,LR}$ threshold for SS/PBCH blocks after scaling a SS/PBCH block transmission power with a value provided by higher layer parameter, Pc_SS.

In slots where the radio link quality according to the set $\bar{q}_0$ is assessed, the physical layer in the UE provides an indication to higher layers when the radio link quality for all corresponding resource configurations in the set $\bar{q}_0$ that the UE uses to assess the radio link quality is worse than the threshold $Q_{out,LR}$. Also, the UE provides to higher layers information identifying a periodic CSI-RS configuration index or SS/PBCH block index $q_{new}$ from the set $\bar{q}_1$.

A UE may be configured with one control resource set ("CORESET") by higher layer parameter Beam-failure-Recovery-Response-CORESET. The UE may receive a configuration for a PRACH transmission from higher layers, e.g., by parameter Beam-failure-recovery-request-RACH-Resource. After 4 slots from the slot of the PRACH transmission, the UE monitors PDCCH for a DCI format with CRC scrambled by C-RNTI, within a window configured by higher layer parameter Beam-failure-recovery-request-window, and receives PDSCH according to an antenna port quasi co-location associated with periodic CSI-RS configuration or SS/PBCH block with index $q_{new}$ from the set $\bar{q}_1$, in the control resource set configured by higher layer parameter Beam-failure-Recovery-Response-CORESET However, the above described LR beam failure recovery procedure does not take into account improvement in the radio condition of any of the current set of used Beams ($\bar{q}_0$). Also, dedicated PRACH resources may not be available for use to every UE for all possible Beams where a recovery might be anticipated. Moreover, the above described LR beam failure recovery procedure does not take into account the RLM procedure, leading to ambiguity where one procedure indicates unsuccessful recovery and the other does not.

FIG. 1 depicts a wireless communication system 100 for the handling of beam failure at a UE, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

As discussed in further detail below, the remote unit 105 may communicate with the base unit 110 using a set of beams. However, the remote unit 105 may determine beam failure for each beam in the set, for example due to movement of the remote unit 105 with respect to the base unit 110, due to changing radio conditions, or the like. Upon detecting beam failure, the remote unit 105 performs beam recovery and beam revival procedures concurrently.

Figure 2:
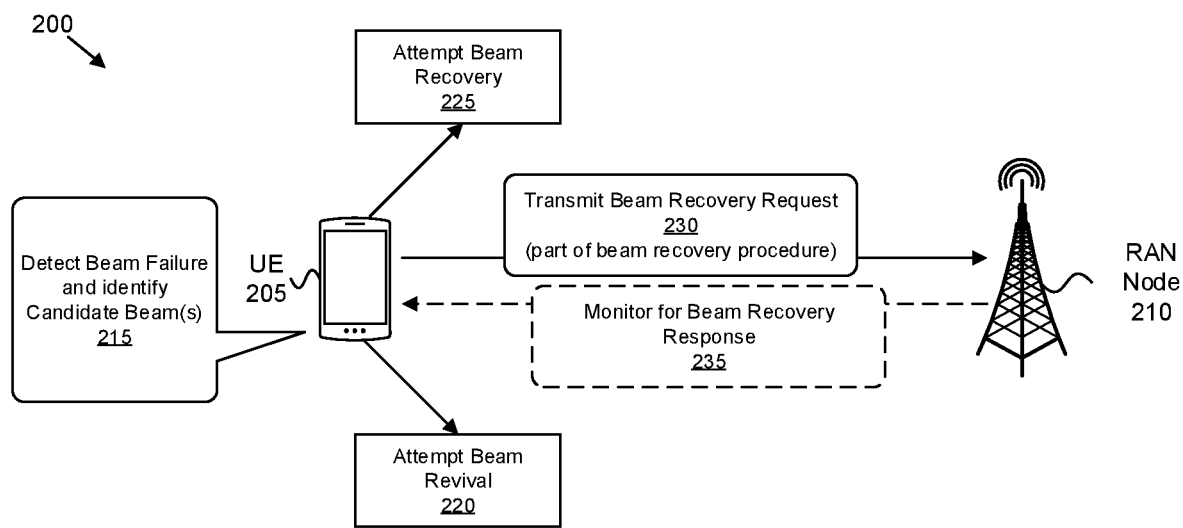
FIG. 2 illustrates one embodiment of a network architecture for recovering from beam failure.

FIG. 2 depicts a network 200 used for efficiently recovering from beam failure, according to embodiments of the disclosure. The network 200 includes a UE 205 and a RAN node 210, such as a gNB. The network 200 depicts a simplified embodiment of the wireless communication system 100. The UE 205 may be one embodiment of the remote unit 105, while the RAN node 210 may be one embodiment of the base unit 110. Here, the RAN node 210 may be a gNB or 5G base station. Although only one UE 205 is depicted, in other embodiments the RAN node 210 may serve a plurality of the UEs 205.

As depicted, the UE 205 detects beam failure and identifies one or more candidate beams (block 215). Next, the UE 205 begins a beam revival procedure, e.g., responsive to detecting the beam failure (block 220). At the same time, the UE 205 attempts beam recovery (block 225) which includes sending a beam recovery request (see messaging 230) and monitoring for a beam recovery response from the RAN node 210 (see messaging 235).

In various embodiments, if one of the Beam Revival procedure or Beam Recovery procedure fails (or is declared unsuccessful due to a corresponding timer running out), then the UE 205 permits the other procedure to run to completion (e.g., until its corresponding timer expires, until a gNB response is received, or until Beam Revival succeeds). Moreover, when one procedure is successful while the other one is still running, then the running procedure may be stopped. For example, if the UE 205 receives the beam recovery response from the RAN node 210 while the beam revival procedure is still performing, then the UE 205 stops attempting beam revival even if an associated timer is unexpired.

Figure 3:
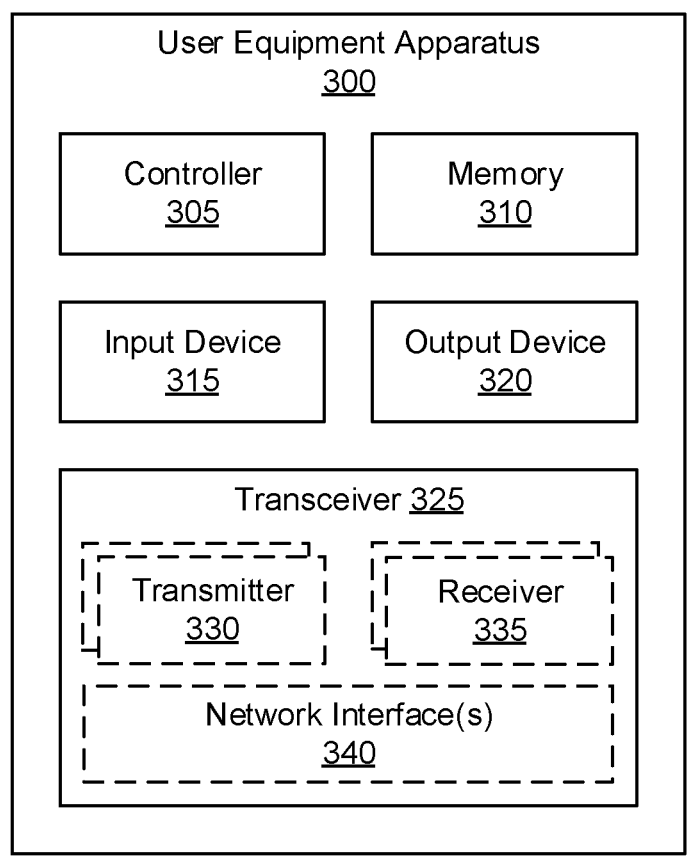
FIG. 3 is a schematic block diagram illustrating one embodiment of a user equipment apparatus for efficiently recovering from beam failure.

FIG. 3 depicts one embodiment of a user equipment apparatus 300 that may be used for the handling of beam failure at a UE. The user equipment apparatus 300 may be one embodiment of the remote unit 105. Furthermore, the user equipment apparatus 300 may include a processor 305, a memory 310, an input device 315, an output device 320, and a transceiver 325. In some embodiments, the input device 315 and the output device 320 are combined into a single device, such as a touchscreen. In certain embodiments, the user equipment apparatus 300 does not include any input device 315 and/or output device 320. In various embodiments, the user equipment apparatus 300 may include one or more of the processor 305, the memory 310, and the transceiver 325, and may not include the input device 315 and/or the output device 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

The transceiver 325 communicates with a base unit (e.g., RAN node, such as a gNB) using a first set of beams. The user equipment apparatus 300 may be configured with at least two sets of beams: a first set, q0, an active set used for beam failure detection; and a second set, q1, an inactive set of candidate beams used for beam recovery. Beam failure may be determined by monitoring radio link quality of the set q0, e.g., by measuring on one or more beam failure detection reference signals in the set q0.

In various embodiments, the processor 305 detects beam failure for each beam in the first set of beams (e.g., set q0) and initiates a beam revival procedure in parallel with a beam recovery procedure. Here, the beam recovery procedure includes transmitting a beam failure recovery request ("BFRR"). The processor 305 terminates the beam recovery procedure in response to successful beam revival of at least one beam in the first set and prior to receiving a BFRR response from the base unit. Additionally, the processor 305 re-starts communication with the base unit using the first set of beams in response to successful beam revival of at least one beam in the first set (e.g., set q0).

In various embodiments, the processor 305 terminates the beam revival procedure in response to receiving a BFRR response from the base unit and re-starts communication with the base unit using a new active beam (e.g., from set q1) in response to the BFRR response, wherein the new active beam is associated with the received BFRR response. In certain embodiments, the new active beam is indicated in the BFRR response. In certain embodiments, a downlink reference signal of the new active beam is quasi-co-located with a DM-RS of PDCCH, wherein the PDCCH includes scheduling information for the BFRR response. In some embodiments, the first set of beams is an active set of beams and the apparatus is further configured with a second set of candidate beams used for beam failure recovery.

In some embodiments, initiating the beam revival procedure in parallel with a beam recovery procedure includes the processor 305 determining a resource for transmitting the BFRR, transmitting the BFRR on the determined resource, and monitoring for a BFRR response while the beam revival procedure is not successful for at least one beam in the first set. In such embodiments, terminating the beam recovery procedure may include stopping the monitoring for a BFRR response.

As discussed above, the processor 305 may detect beam failure for each beam in the first set of beams based on measurements on one or more beam failure detection reference signals. In such embodiments, the beam revival procedure includes monitoring the one or more beam failure detection reference signals until a radio link failure ("RLF") timer expires.

In some embodiments, the transceiver 325 receives a configuration for the beam revival procedure. Here, the configuration for the beam revival procedure indicates at least one of: a first number of consecutive beam revival instances, a RSRP threshold value, and a BLER threshold value. In one embodiment, the beam revival procedure is determined to be successful for an active beam of the first set in response to a RSRP measurement value of the active beam being above the configured RSRP threshold value for the first number of consecutive beam revival instances.

In another embodiment, the beam revival procedure is determined to be successful for an active beam of the first set in response to a hypothetical BLER of the active beam being above the configured BLER threshold value for the first number of consecutive beam revival instances. In certain embodiments, the beam revival procedure is determined to be successful for an active beam of the first set in response to a PDCCH being successfully decoded, where a DM-RS of the PDCCH is quasi-co-located with a beam failure detection reference signal of the active beam.

In some embodiments, the processor 305 further identifies a new beam using a set of candidate beam reference signals (e.g., set q1) and determines a resource for transmitting the BFRR based on the identified new beam. In certain embodiments, terminating the beam recovery procedure includes stopping transmission of the BFRR in response to the beam revival procedure being successful for at least one of the one or more active beams. In certain embodiments, the processor 305 further releases a grant-free or SPS allocation if detecting beam failure for all of the one or more active beams.

In some embodiments, the processor 305 further sends an In-Sync indication for RLM to a higher layer in response to the beam revival procedure being successful for at least one beam of the first set and sends an Out-of-Sync indication for RLM to the higher layer in response to detecting beam failure for each beam of the first set.

In various embodiments, transmitting the BFRR includes transmitting a contention-free random-access ("CFRA") preamble. The ("CFRA") RACH resources including the Preamble sequence and the time-frequency resources may be limited, e.g., there are only 64 Preamble sequences available per PRACH transmission occasion defined also in NR (e.g., 5G Radio Access Technology). Where CFRA resources are unavailable, transmitting the BFRR may then include transmitting a contention-based random-access preamble. In some embodiments, the processor 305 further receives a Backoff MAC subheader in a Random-Access Response message, the Random-Access Response message being a response to the contention-based random-access preamble, but does not apply a random Backoff for transmitting the BFRR.

In certain embodiments, the contention-based random access includes a four-step random-access procedure, wherein a third message of the four-step random-access procedure includes a MAC CE including a bitmap with each bit of the bitmap indicating a corresponding beam identity (e.g., a beam index). In other embodiments, the contention-based random access includes a two-step random-access procedure, wherein a first message of the two-step random-access procedure includes a PRACH preamble and PRACH data, wherein the PRACH data includes at least a UE identity and is transmitted according to an uplink timing advance value calculated based on a receive timing difference between an active beam of the first set and a newly found beam.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data related to the handling of beam failure at a UE. For example, the memory 310 may store beam identities, beam sets, beam measurements, downlink/uplink control information, scheduling information, and the like. In certain embodiments, the memory 310 also stores program code and related data, such as an operating system or other controller algorithms operating on the user equipment apparatus 300.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, is designed to output visual, audible, and/or haptic signals. In some embodiments, the output device 320 includes an electronically controllable display or display device capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display separate from, but communicatively coupled to, the rest of the user equipment apparatus 300, such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

The transceiver 325 includes at least transmitter 330 and at least one receiver 335. The transceiver 325 may be used to communicate with a RAN node, such as the base unit 110. Although a specific number of transmitters 330 and receivers 335 are illustrated, the user equipment apparatus 300 may have any suitable number of transmitters 330 and receivers 335. Moreover, the transceiver 325 may support one or more network interfaces 340, for example a 'Uu' interface with a RAN node, a 'N1' interface with an AMF, among other interfaces.

Figure 4:
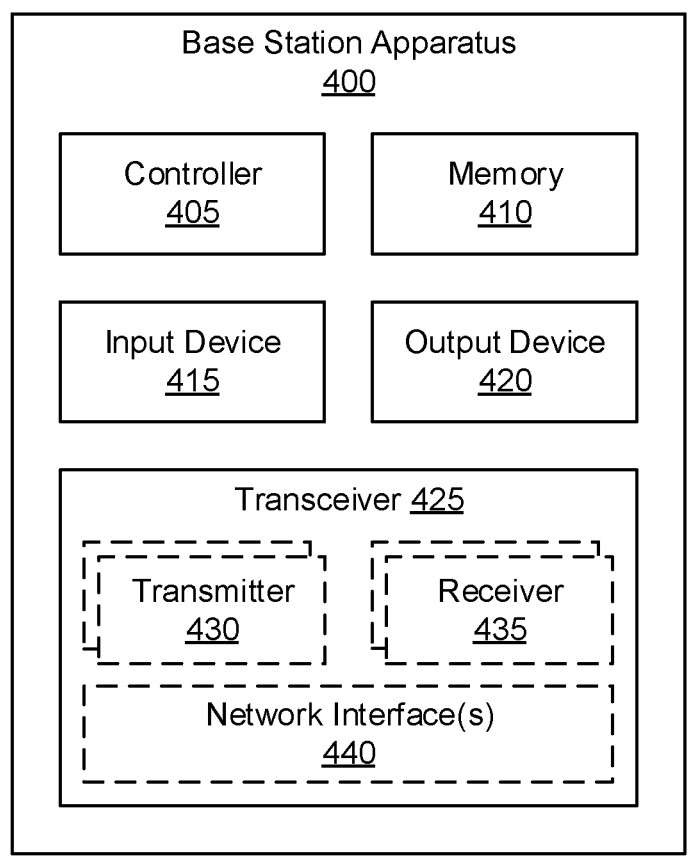
FIG. 4 is a schematic block diagram illustrating one embodiment of a base station apparatus for efficiently recovering from beam failure.

FIG. 4 depicts one embodiment of a base station apparatus 400 that may be used for the handling of beam failure at a UE, according to embodiments of the disclosure. The base station apparatus 400 may be one embodiment of the base unit 110 and/or RAN node 210, described above. Furthermore, the base station apparatus 400 may include a processor 405, a memory 410, an input device 415, an output device 420, a transceiver 425 for communicating with one or more remote units 105 and/or a mobile core network 140.

As depicted, the transceiver 425 may include a transmitter 430 and a receiver 435. The transceiver 425 may also support one or more network interfaces 440, such as the Uu interface, N2 interface, N3 interface, and/or other network interfaces suitable for communication with a remote unit and/or core network. In some embodiments, the input device 415 and the output device 420 are combined into a single device, such as a touchscreen. In certain embodiments, the base station apparatus 400 may not include any input device 415 and/or output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In some embodiments, the processor 405 controls the transceiver 425 to receive a signaling request from a remote unit, such as the remote unit 105 and/or the UE 205. In various embodiments, the signaling request may be transmitted over PUCCH. For example, if the remote unit is configured with (dedicated) PUCCH resources for particular logical channel and data arrives for said logical channel, then the remote unit transmits (and the transceiver 425 receives) the signaling request on the PCC at resources. However, if the remote unit is not configured with (dedicated) PUCCH resources for the logical channel for which data arrives, then the remote unit transmits (and the transceiver 425 receives) the signaling request on either a PRACH resource or a different PUCCH resource, as described herein. The processor 405 may respond to the SR (e.g., received via PUCCH or PRACH) with an uplink grant. In response to receiving a BSR, the processor 405 may allocate the remote unit 105 with PUSCH resources.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to the handling of beam failure at a UE. For example, the memory 410 may store scheduling data, uplink data, remote unit (the UE) identities, and the like. In some embodiments, the memory 410 also stores program code and related data, such as an operating system or other controller algorithms operating on the remote unit 105 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes two or more different devices, such as a keyboard and a touch panel. In certain embodiments, the input device 415 may include a camera for capturing images or otherwise inputting visual data.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 communicates with remote unit within a mobile communication network. The transceiver 425 may also communicate with a core network, such as the mobile core network 140. The transceiver 425 may include one or more transmitters 430 and one or more receivers 435. As discussed above, the transceiver 425 may support one or more the network interface 440 for communicating with remote units 105 and the mobile core network 140.

Figure 5:
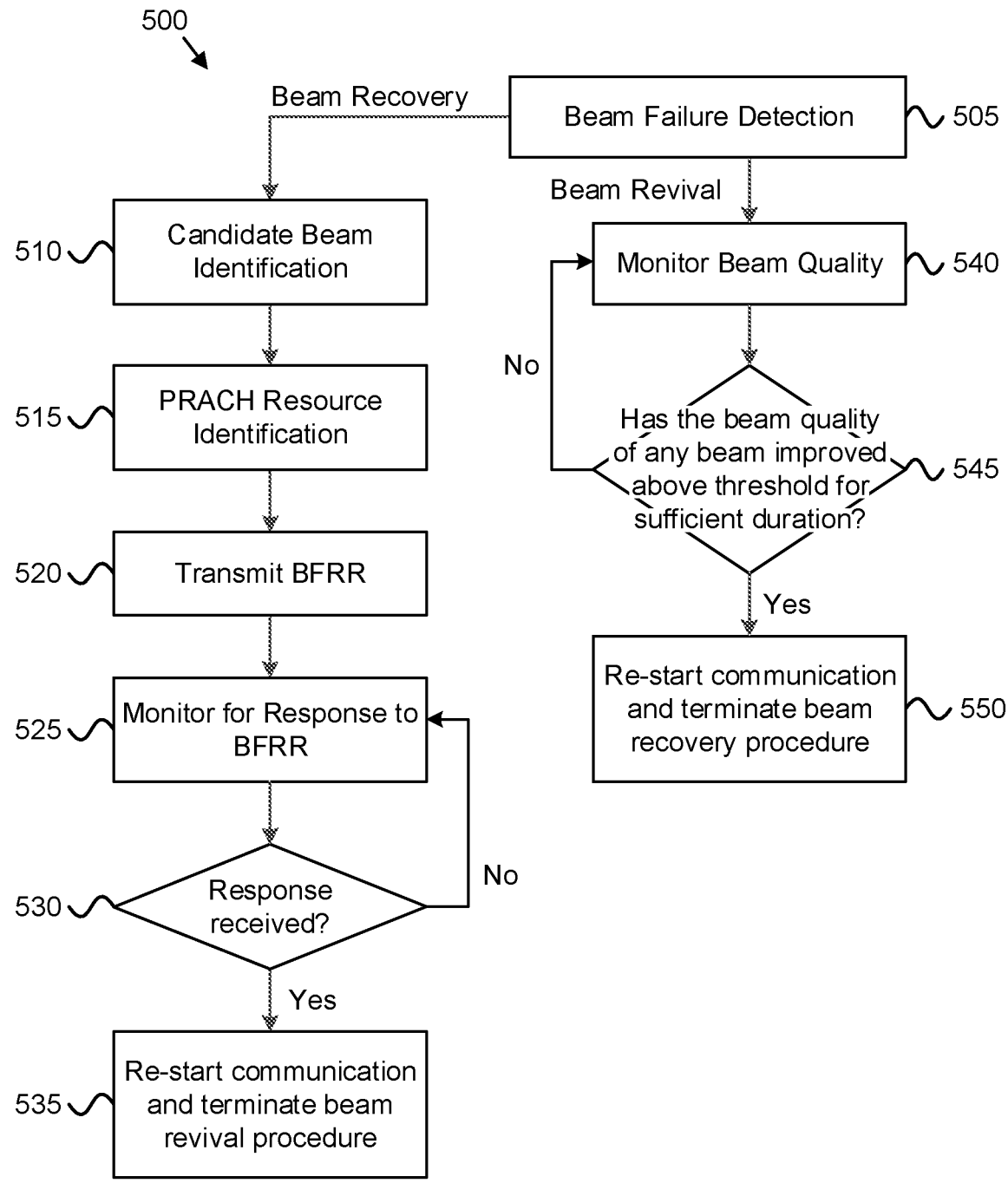
FIG. 5 is a schematic flow chart diagram illustrating one embodiment of recovering from beam failure.

FIG. 5 is a schematic flow chart diagram illustrating one embodiment of a procedure 500 for recovering from beam failure, according to embodiments of the disclosure. The procedure 500 may be performed by a UE, such as the remote unit 105, the UE 205, and/or the user equipment apparatus 300 to recover from a beam failure condition.

The procedure 500 begins with a beam failure detection phase (see block 505). Periodic CSI-RS or SSB, spatially Quasi co-located with PDCCH DM-RS, is used for beam failure detection. In some embodiments, a SS-block based RS within the serving cell is used for BF detection if, for example, a SS-block is also used in beam management as well. If hypothetical PDCCH BLERs of all of these (configured) RS types are above a threshold, it is counted as beam failure instance.

Having detected the beam failure, the procedure 500 implements for beam recovery and beam revival in parallel. The beam recovery procedure is described in steps 510-535, while beam revival is described in steps 540-550. If one of the procedures fails, or is declared unsuccessful due to corresponding Timer running out, then the other runs to completion (e.g., until it's corresponding Timer running out or until a gNB responses is received or Beam Revival succeeds). However, if one of the procedure recovers/revives successfully while the other one is still running, then the still running procedure is stopped.

During beam recovery, the UE identifies a candidate beam (see block 510). During candidate beam identification, a configurable L1-RSRP and/or a fixed BLER value could be used for Candidate Beam identification. Specific Candidate Beam identification RSs are used for new/candidate beams where the system supports the CSI-RS+SS block case for the purpose of new candidate beam identification. The RRC parameter Candidate-Beam-RS-Identification-Resource may mean either the type of reference signal or the actual resources used for beam failure recovery or both.

Next, the procedure 500 includes identifies PRACH resources (see block 515) and transmits a Beam Recovery Request (see block 520). In certain embodiments, the UE tries recovery only on "good" Beams, e.g., Beams above a certain quality measured using RSRP on the corresponding DL RS against a certain quality-threshold. If the "good" beams have dedicated PRACH resources, e.g., Contention Free Random Access ("CFRA") resources, then these are used. However, note that CFRA resources may be limited as the gNB may not be able to predict on which Beams may a UE recover, for example due to there being too many the UEs. Thus, if no CRRA resources are available for transmitting the BFRR, then the UE sends BFRR using Contention Based Random Access ("CBRA"), as discussed in greater detail below.

In certain embodiments, a dedicated PRACH resource is configured to either an SSB or a CSI-RS resource. The following two scenarios are supported when a UE is configured with CSI-RS+SSB: In the first scenario, PRACHs are associated to SSBs only. Here, PRACH resources for CSI-RS resources configured for new beam identification may be found from the QCL association between CSI-RS resource(s) and SSB(s). In the second scenario, each of the multiple PRACHs is associated to either an SSB or a CSI-RS resource.

Once the PRACH resources have been determined, the UE goes on to transmit the BF Recovery Request, or BFRR using the determined PRACH resources. A Beam-Failure-Recovery-Timer is used to control the amount of BFRR that the UE should make before giving up. Alternatively, the actual number of BFRR requests could be controlled by using higher layer configuration and when the said number of BFRR requests has been made, without receiving a corresponding gNB response, the UE concludes the Beam Failure recovery procedure as unsuccessful.

The Beam-Failure-Recovery-Timer may be started once beam failure is declared (see block 505). Alternatively, the Beam-Failure-Recovery-Timer may be started once a candidate beam is identified (see block 510). In a third alternative, the Beam-Failure-Recovery-Timer is started at the time of the first BFRR transmission.

Next, the procedure 500 includes monitoring for a response from the gNB (see block 525). After sending the BFRR(s), RRC configuration of a time duration for a time window and a dedicated CORESET for a UE to monitor gNB response for beam failure recovery request is used. Here, the UE assumes that the dedicated CORESET is spatial Quasi co-located with a downlink RS of the UE-identified candidate beam in the BFRR. Additionally, multiple dedicated CORESETs may be configured to a UE, where each CORESET may have different spatial Quasi co-location ("QCL") configuration. Note that the time window is determined by a fixed time offset defined with respect to BFRR transmission and the RRC configurable time duration starting from the fixed time offset.

Upon reception of gNB response (see block 530), the Beam Failure Recovery ("BFR") procedure is considered successful from the UE perspective. In this case, CORESET-BFR is monitored till reconfiguration. The UE re-starts communication using a candidate beam indicated in the gNB response and terminates the beam revival procedure (see block 535).

Unsuccessful recovery from beam failure is declared upon reaching the configured maximum number of BFRR transmission, or upon expiry of the beam failure recovery timer, e.g., when the beam failure recovery timer starts upon beam failure detection. In one embodiment, the UE no longer monitors previously configured CORESET(s) upon unsuccessful recovery from beam failure. In another embodiment, the UE Continue monitoring previously configured CORESET(s) upon unsuccessful recovery from beam failure.

The Beam Revival Procedure ("BRP") takes into account improvements in the radio condition of any of the current set of used Beams ($\bar{q}_0$). These beams may become usable again if the UE moves and/or the radio changes back to its initial condition. During beam revival, the UE monitors the radio link quality of the current set of Beams ($\bar{q}_0$) (see block 540).

When the Beam quality of the any of the Beam in the current Beam set ($\bar{q}_1$) improves beyond a threshold a consecutive number of at least N_revive times (or a time duration), then the said current Beam(s) is said to have 'Revived' (see block 545). Further, the UE re-starts communication using a candidate beam indicated in the gNB response and terminates the beam failure recovery procedure (see block 550).

In various embodiments, the beam revival procedure is determined to be successful for an active beam of the first set in response to a RSRP measurement value of the active beam being above the configured RSRP threshold value for the first number of consecutive beam revival instances, in response to a hypothetical BLER of the active beam being above the configured BLER threshold value for the first number of consecutive beam revival instances, and/or in response to a PDCCH being successfully decoded, where a DM-RS of the PDCCH is quasi-co-located with a beam failure detection reference signal of the active beam.

Figure 6:
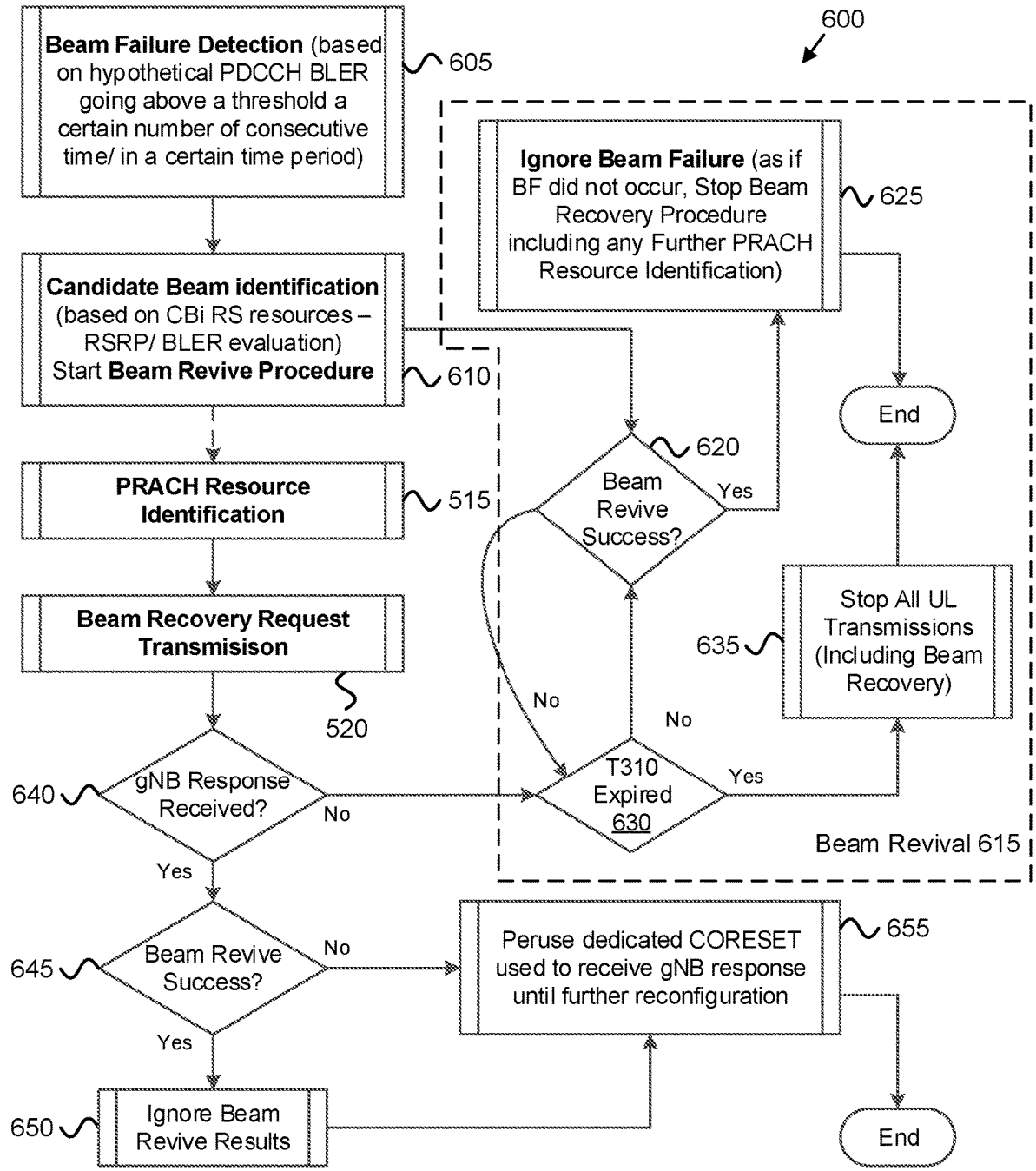
FIG. 6 is a schematic flow chart diagram illustrating one embodiment of a beam revival procedure incorporating RLM procedure to recover from beam failure.

FIG. 6 is a schematic flow chart diagram illustrating one embodiment of a beam revival procedure 600 for beam revival procedure incorporating RLM procedure to recover from beam failure, according to embodiments of the disclosure. The beam revival procedure 600 improves on the BFR procedure by addressing the above stated problems of improving radio conditions, limited PRACH resources, and interactions with RLM procedures.

The beam revival procedure 600 begins with a beam failure detection phase (see block 605). Periodic CSI-RS or SSB, spatially Quasi co-located with PDCCH DM-RS, is used for beam failure detection. In some embodiments, a SS-block based RS within the serving cell is used for BF detection if, for example, a SS-block is also used in beam management as well. If hypothetical PDCCH BLERs of all of these (configured) RS types are above a threshold, it is counted as beam failure instance.

Having detected the beam failure, the beam revival procedure 600 identifies a candidate beam (see block 610). Here, the Candidate Beam identification is based on CBi resources and RSPS/BLER evaluation. In certain embodiments, a configurable L1-RSRP and/or a fixed BLER value may be used for Candidate Beam identification. Specific Candidate Beam identification RSs are used for new/candidate beams, for example where the system supports the CSI-RS+SS block case for the purpose of new candidate beam identification. The RRC parameter Candidate-Beam-RS-Identification-Resource may mean either the type of reference signal or the actual resources used for beam failure recovery or both.

At this point, the beam revival procedure 600 begins a beam revival process 615, as discussed below. If beam revival is successful (see block 620), then the beam failure is ignored (see block 625). Otherwise, if the beam revival is not successful and a corresponding timer, such as the T310 timer, expires (see block 630), then the beam revival procedure 600 stops UL transmissions (see block 635).

While attempting the beam revival, the beam revival procedure 600 continues with the beam failure recovery by identifying PRACH resources (see block 515) and transmitting a Beam Failure Recovery Request (:BFRR", see block 520). In certain embodiments, the UE tries recovery only on "good" Beams, e.g., Beams above a certain quality measured using RSRP on the corresponding DL RS against a certain quality-threshold. If the "good" beams have dedicated PRACH resources, e.g., Contention Free Random Access ("CFRA") resources, then these are used. However, note that CFRA resources may be limited as the gNB may not be able to predict on which Beams may a UE recover, for example due to there being too many the UEs. Thus, if no CRRA resources are available for transmitting the BFRR, then the UE sends BFRR using Contention Based Random Access ("CBRA"), as discussed in greater detail below.

Similar to that described above with reference to FIG. 5, the beam revival procedure 600 includes monitoring for a response from the gNB (see block 640). If a response is received, then the beam revival procedure 600 determines whether the beam revival process 615 was successful (see block 645). If beam revival was successful and a response was received from the gNB, then the beam revival results are ignored (see block 650) and the UE CORESET-BFR is monitored until reconfiguration (see block 655). Additionally, the UE monitors the UE CORESET-BFR until reconfiguration if the beam revival process 615 was unsuccessful (see block 655).

Note that the beam revival procedure 600 includes performing both Beam Recovery and Beam Revival procedures after the Beam Failure ("BF") detection. If one of the procedures fails, or is declared unsuccessful due to corresponding Timer running out, then the other runs to completion (e.g., until it's corresponding Timer running out or until a gNB responses is received or Beam Revival succeeds). However, when one of the procedure recovers/revives successfully while the other one is still running, then the still running procedure is stopped.

In order to take into account improvement in the radio condition of any of the current set of used Beams ($\bar{q}_0$), in the beam revival procedure 600, the UE is configured with a number, N_revive (or a time duration) and when the Beam quality of the any of the Beam in the current Beam set ($\bar{q}_1$) improves beyond a threshold a consecutive number of at least N_revive times then the said current Beam(s) is said to have 'Revived.'

A RSRP threshold or BLER target may be used for determining Revival such that the RSRP of the DL RS corresponding to the said Beam is above a Thresh_Revive_RSRP or the BLER improves (goes below) a certain Thresh_Revive_BLER. Thresh_Revive_BLER used could be same as the BLER target used for In-Sync determination in case of RLM (Radio Link Monitoring). In an alternative embodiment, if the UE did not stop to monitor the current CORESET(s) (for example, if the UE has multiple RF chains at a receiver, the UE can monitor the current CORESET and CORESET configured for receiving beam failure request response), the real PDCCH reception may also be construed as a Revival of the corresponding Beam (where the PDCCH is received).

The Revival procedure may run in parallel to BFRR procedure in MAC (to send the PRACH) and will stop BFRR procedure if such Revive happens. For example, the UE may stop transmitting a new BF Recovery Request when the Beam Revival procedure is successful. N_revive may have configurable values starting with integer 1 and go further like 2, 3 or 4 etc. The start time of the Revival procedure could be from the point in time when the BF is detected. The Revival procedure may go on until successful or until the expiry of RLF timer (e.g., the RRC timer T310) or the said Beam-Failure-Recovery-Timer. Once the Beam Failure is detected, the UE may stop monitoring the corresponding CORESET(s) and stop using all grant-free and SPS allocations on the failed beams unless either the Beam Revival or Beam Recovery procedure becomes successful or until the network successfully reconfigures the UE. Furthermore, the UE may not make any PUCCH transmissions on the current beam set, e.g., HARQ ACK/NACK, once Beam Failure has been declared. According to an alternative embodiment, the UE may release grant-free/SPS allocations once Beam Failure has been declared.

In order to solve the problem of limited PRACH resources (refer to block 515), note that CFRA (Contention Free Random Access) resources may be limited as the gNB 210 may not be able to predict on which Beams may a UE recover, for example due to there being too many the UEs. If CFRA resources are limited, then the network may configure, explicitly or implicitly, whether CBRA (Contention Based Random Access) may be used to transmit the BFRRs, for example using the Broadcast or dedicated RRC signaling. Moreover, contention resolution for when CBRA is performed make occur using one of the two following embodiments.

The first contention resolution embodiment uses a modification to the 3GPP 4-step RACH procedure. Here, the UE randomly chooses a preamble and/or physical time-frequency resource from a pool of resources. This pool may or may not be dedicatedly allocated by the gNB for this purpose (e.g., only for RACH). This pool of resource allocated by the gNB may be used by all the UEs or by a specific set of the UEs, wherein each the UE of this specific set is configured dedicatedly with said pool of resource. However, such a dedicated pool of PRACH resources (e.g., preamble sequences and/or time-frequency resources) is not required and this method works even if no such resource pool dedicated to BFRR are reserved.

Further, the gNB response (msg2) carries a UL grant which will be used by the UE to transmit msg3 including a CRNTI MAC CE and the Beam identity or identities, if more than one Beam is good enough to recover (or equivalently the corresponding index or indices), e.g., using a new MAC CE including a BITMAP with each BIT pointing to a corresponding Beam Identity/Index. Msg4 will be addressed to the C-RNTI of the winning the UE, e.g., CRC masking will be done using the C-RNTI of the winning the UE to resolve the contention. Msg3 and Msg4 may be limited to MAC protocol e.g., using MAC Control Elements, e.g., RRC level signaling may not be required.

One limitation of the first contention resolution embodiment problem is that it needs 4 steps to resolve contention and therefore the ensuing delay may be undesirable for Beam Management/Recovery purposes. Accordingly, the second contention resolution embodiment uses a 2-step RACH procedure to improve response times. Similar to the first contention resolution embodiment, in the second embodiment a set of preambles/PRACH time-frequency resources may (or may not) be reserved for beam failure recovery request for a specific set of the UEs. The UE 205 sends PRACH preamble and PRACH data (similar to PUSCH) for the beam failure recovery request, BFRR. The PRACH data contain a UE specific identity like C-RNTI and the Beam identity/index of the Beam (e.g., if more than one Beam is good enough to recover) where the UE is trying to recover in a similar fashion as in the first contention resolution embodiment. Because the Beam identity (or identities) is explicitly signaled, the reservation of a set of preambles and/or PRACH time-frequency resources is not necessary to this end but such reservation (of a dedicated pool of resources) may still be done for managing the congestion situation for such RACH Accesses.

Further, the PRACH data may be transmitted with a timing advance value which the UE calculates based on Rx timing difference between a previous serving beam and a newly found beam. The UE monitors CORESET-BFR (determined based on the Quasi co-location with the DL RS corresponding to the new identified candidate beam) to receive a gNB response message and to perform further communication until it is re-configured to another CORESET or another TCI state. The gNB response (msg2) is addressed to the UE specific identity like C-RNTI and may optionally include the Beam Identity where the gNB approves the UE Beam Recovery. Due to the UE's autonomous timing adjustment for the new beam, the CP length required for PRACH data may be much shorter than CP length for PRACH preamble. The gNB estimates the UE's UL TA based on PRACH preamble and signals the new UL TA to the UE.

In a further improvement, instead of using a preamble sequence in Msg1, the UE may just use a PUCCH resource to signal the Beam identity and the UE specific identity like C-RNTI or any identity/index specific to the specific set of the UEs that have been configured with the said pool of resource allocated by the gNB.

To take into account the RLM procedures when recovering from beam failure, the beam revival procedure may assume that BF and Out-of-Sync conditions are independent, even if the BLER target and the RS (reference signals) might be same but at least the resources used for: RS transmission and measurements, measurements periodicity, measurement duration, etc. will be different. These resources will be separate configuration from the RRC layer and therefore these are related, but still independent procedures yielding different results.

In a first embodiment, if the T310 timer (the RLF timer) is longer than the Beam-failure-recovery-Timer (or if the Maximum number of PRACH transmissions is reached before T310 expiry), then the UE behavior may be one of the following three alternatives: 1) the UE stops Beam recovery (e.g., no PRACH transmission) but still tries to revive the beam; 2) the UE ignores the Beam Failure if the beam revival is successful (and optionally indicates In-Sync indication to the RRC layer); and 3) the UE performs cell selection and RRC Connection Re-establishment upon T310 expiry (e.g., while the T311 timer is still running). However, in this first embodiment, if there is a race condition, such that the Revival succeeds around the same time as gNB responds to the BFRR, then the UE may ignore the Beam revival and continue with the gNB response.

In a second embodiment, if the T310 timer (the RLF timer) is longer than the Beam-failure-recovery-Timer (or if the Maximum number of PRACH transmissions is reached before T310 expiry), then the UE 205 stops the T310 timer (and start the T311 timer) as soon as the Beam-failure-recovery-Timer expires (or maximum number of PRACH transmissions is reached). Optionally, a new indication is sent to the RRC layer when the BFRR Timer expires and the RRC layer stops the T310 timer and starts the T311 timer (or equivalent timers).

Further if the T310 timer (e.g., the RLF timer) is shorter than the Beam-failure-recovery-Timer (or the Maximum number of PRACH transmissions is not reached until after T310 expiry) then the UE may stop all UL transmissions (including Beam recovery) and starts T311 (Perform cell selection and subsequently RRC Connection Re-establishment procedure).

In certain embodiments, network (e.g., 5G core network) may not configure the Beam-failure-recovery-Timer (BFRR Timer) to be larger than the timer T310 but if the Beam-failure-recovery-Timer is not configured and instead a Maximum Number of BFRR Transmissions for controlling maximum Beam recovery request is used; the T310 may expire before such a max BFRR is reached since, e.g., when a RACH Backoff was indicated by network prohibiting the UE to send further BFRRs until sometime. To get rid of such issue, a further embodiment reserves a set of Preambles by the network for facilitating the CBRA- or CFRA-based recovery procedure and these set of reserved preambles (or PRACH time frequency resources) may not be subject to Backoff.

Whether or not Backoff is applied to the corresponding Preamble set may be explicitly or implicitly indicated by the network. In a further improvement, it may be just specified or explicitly configured by the gNB, e.g., using dedicated or broadcast signaling that Backoff indicator (BI) is not applied for RACH access initiated for the purpose of making BFRR. In such a case when no Backoff is to be applied, e.g., based on specification, the UE may ignore any Backoff MAC subheader received in the Random-Access Response irrespective of whether the RACH Preamble/Resources used to send the Msg1 were reserved or not.

In an alternative interworking of the BFR and RLM procedures, the beam revival procedure may assume that BF and Out-of-Sync go together, such that one procedure triggers the other or uses the result from the other directly. Here, the PHY layer may indicate the Out-of-Sync condition to the RRC layer as soon as it initiates the Beam Recovery Procedure. A successful beam revival or successful Beam Recovery procedure is indicated to the RRC layer as In-Sync indication. In this alternative, both Beam Revive and Beam Recovery procedures run until the RRC layer stops all UL transmissions, e.g., until T310 expiry.

Figure 7:
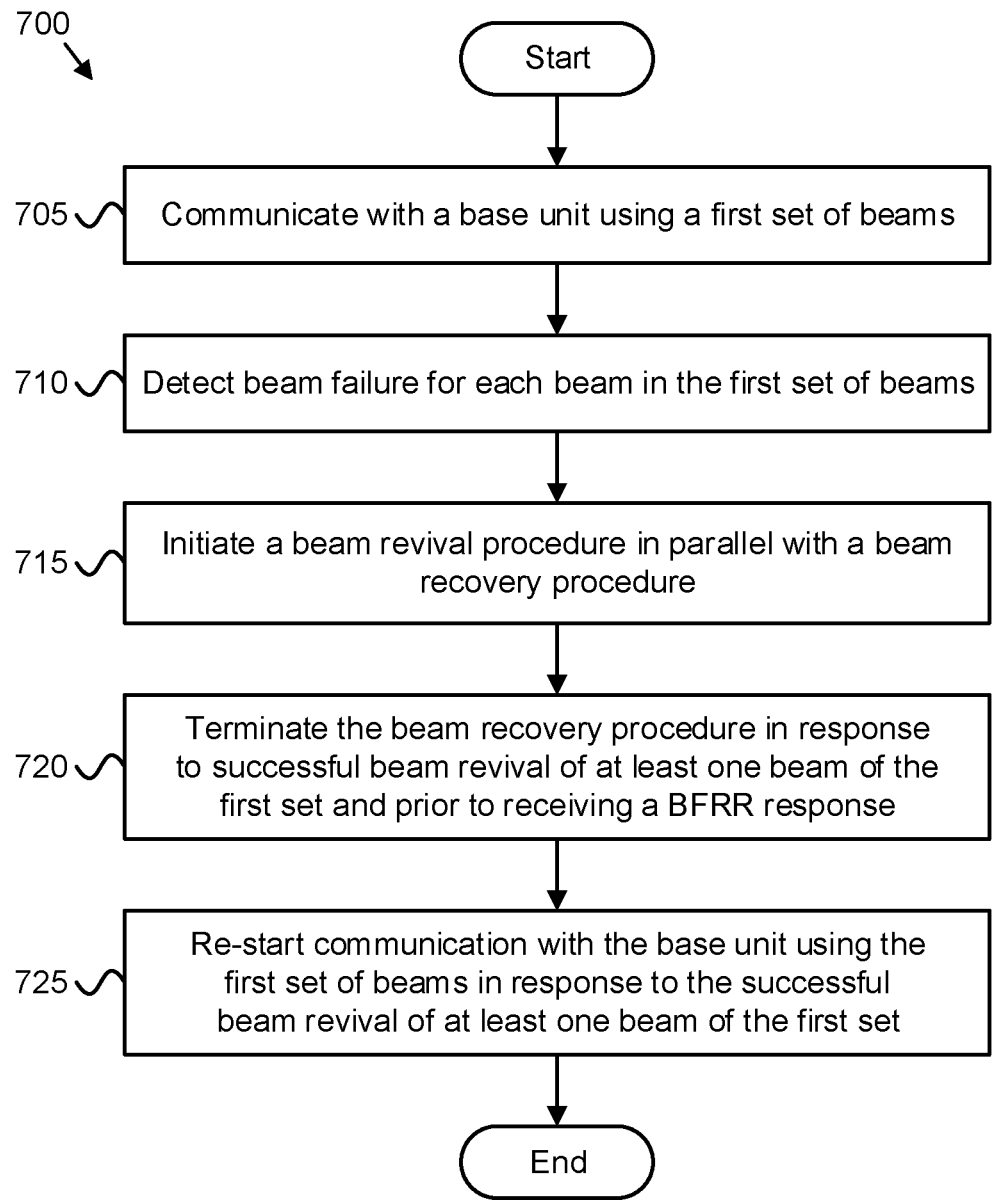
FIG. 7 is a schematic flow chart diagram illustrating one embodiment of a method for efficiently recovering from beam failure.

FIG. 7 depicts a method 700 for handling beam failure, according to embodiments of the disclosure. In some embodiments, the method 700 is performed by an apparatus, such as the remote unit 105, the UE 205, and/or the user equipment apparatus 300. In certain embodiments, the method 700 may be performed by a processor executing program code, for example, a microcontroller, a microprocessor, a CPU, a GPU, an auxiliary processing unit, a FPGA, or the like.

The method 700 begins and the apparatus communicates 705 with a base unit using a first set of beams. The method 700 includes detecting 710 beam failure for each beam in the first set of beams. In certain embodiments, detecting 710 the beam failure is based on measurements on one or more beam failure detection reference signals.

The method 700 includes initiating 715 a beam revival procedure in parallel with a beam recovery procedure. Here, the beam recovery procedure comprises transmitting a BFRR. In some embodiments, initiating 715 the beam revival procedure in parallel with a beam recovery procedure includes determining a resource for transmitting the BFRR, transmitting the BFRR on the determined resource, and monitoring for a BFRR response while the beam revival procedure is not successful (e.g., for at least one beam in the first set). In some embodiments, the beam revival procedure includes monitoring the one or more beam failure detection reference signals until a radio link failure ("RLF") timer expires.

The method 700 includes terminating 720 the beam recovery procedure in response to successful beam revival of at least one beam in the first set and prior to receiving a BFRR response from the base unit. In certain embodiments, terminating 720 the beam recovery procedure includes stopping transmission of the BFRR if beam revival is successful for at least one of the one or more active beams. In certain embodiments, terminating 720 the beam recovery procedure includes stopping the monitoring for a BFRR response.

The method 700 includes re-starting 725 communication with the base unit using the first set of beams in response to successful beam revival of at least one beam in the first set. The method 700 ends. In one embodiment, the beam revival procedure is determined to be successful for an active beam of the first set in response to a RSRP measurement value of the active beam being above the configured RSRP threshold value for the first number of consecutive beam revival instances. In another embodiment, the beam revival procedure is determined to be successful for an active beam of the first set in response to a hypothetical BLER of the active beam being above the configured BLER threshold value for the first number of consecutive beam revival instances. In certain embodiments, the beam revival procedure is determined to be successful for an active beam of the first set in response to a PDCCH being successfully decoded, wherein a DM-RS of the PDCCH is quasi-co-located with a beam failure detection reference signal of the active beam.

Disclosed herein is a first apparatus for the handling of beam failure at a UE. The first apparatus may be a user terminal, such as a remote unit 105, the UE 205, and/or user equipment apparatus 300. The first apparatus includes a transceiver that communicates with a base unit using a first set of beams. The first apparatus includes a processor that detects beam failure for each beam in the first set of beams and initiates a beam revival procedure in parallel with a beam recovery procedure. Here, the beam recovery procedure includes transmitting a beam failure recovery request ("BFRR"). The processor terminates the beam recovery procedure in response to successful beam revival of at least one beam in the first set and prior to receiving a BFRR response from the base unit. Additionally, the processor re-starts communication with the base unit using the first set of beams in response to successful beam revival of at least one beam in the first set.

In various embodiments, the processor further terminates the beam revival procedure in response to receiving a BFRR response from the base unit and re-starts communication with the base unit using a new active beam in response to the BFRR response, wherein the new active beam is associated with the received BFRR response. In certain embodiments, the new active beam is indicated in the BFRR response. In certain embodiments, a downlink reference signal of the new active beam is quasi-co-located with a DM-RS of PDCCH, wherein the PDCCH includes scheduling information for the BFRR response. In some embodiments, the first set of beams is an active set of beams and the apparatus is further configured with a second set of beams used for beam failure recovery.

In some embodiments, initiating the beam revival procedure in parallel with a beam recovery procedure includes the processor determining a resource for transmitting the BFRR, transmitting the BFRR on the determined resource, and monitoring for a BFRR response, if the beam revival procedure is not successful for at least one beam in the first set. In such embodiments, terminating the beam recovery procedure includes stopping the monitoring for a BFRR response. In certain embodiments, the processor detects beam failure for each beam in the first set of beams based on measurements on one or more beam failure detection reference signals. In such embodiments, the beam revival procedure includes monitoring the one or more beam failure detection reference signals until a radio link failure ("RLF") timer expires.

In some embodiments, the transceiver receives a configuration for the beam revival procedure. Here, the configuration for the beam revival procedure indicates at least one of: a first number of consecutive beam revival instances, a RSRP threshold value, and a BLER threshold value. In one embodiment, the beam revival procedure is determined to be successful for an active beam of the first set in response to a RSRP measurement value of the active beam being above the configured RSRP threshold value for the first number of consecutive beam revival instances. In another embodiment, the beam revival procedure is determined to be successful for an active beam of the first set in response to a hypothetical BLER of the active beam being above the configured BLER threshold value for the first number of consecutive beam revival instances. In certain embodiments, the beam revival procedure is determined to be successful for an active beam of the first set in response to a PDCCH being successfully decoded, where a DM-RS of the PDCCH is quasi-co-located with a beam failure detection reference signal of the active beam.

In some embodiments, the processor further identifies a new beam using a set of candidate beam reference signals and determines a resource for transmitting the BFRR based on the identified new beam. In certain embodiments, terminating the beam recovery procedure includes stopping transmission of the BFRR in response to the beam revival procedure being successful for at least one beam of the first set of beams. In certain embodiments, the processor further releases a grant-free or SPS allocation if detecting beam failure for all beams of the first set of beams. In some embodiments, the processor further sends an In-Sync indication for RLM to a higher layer in response to the beam revival procedure being successful for at least one beam of the first set and sends an Out-of-Sync indication for RLM to the higher layer in response to detecting beam failure for each beam of the first set.

In various embodiments, transmitting the BFRR includes transmitting a contention-based random-access preamble. In some embodiments, the processor further receives a Backoff MAC subheader in a Random-Access Response message, the Random-Access Response message being a response to the contention-based random-access preamble, but does not apply a random Backoff for transmitting the BFRR. In certain embodiments, the contention-based random-access preamble is part of a four-step random-access procedure, wherein a third message of the four-step random-access procedure includes a MAC CE including a bitmap with each bit of the bitmap indicating a corresponding beam identity. Here, the beam identity may be a beam index. In other embodiments, the contention-based random-access preamble is part of a two-step random-access procedure, wherein a first message of the two-step random-access procedure includes a PRACH preamble and PRACH data, wherein the PRACH data includes at least a UE identity and is transmitted according to an uplink timing advance value calculated based on a receive timing difference between an active beam of the first set and a newly found beam.

Disclosed herein is a first method for the handling of beam failure at a UE. The first method may be performed by a user terminal, such as a remote unit 105, the UE 205, and/or user equipment apparatus 300. The first method includes communicating with a base unit using a first set of beams and detecting beam failure for each beam in the first set of beams. The first method includes initiating a beam revival procedure in parallel with a beam recovery procedure. Here, the beam recovery procedure includes transmitting a BFRR. The first method includes terminating the beam recovery procedure in response to successful beam revival of at least one beam in the first set and prior to receiving a BFRR response from the base unit and re-starting communication with the base unit using the first set of beams in response to successful beam revival of at least one beam in the first set.

In various embodiments, the first method also includes terminating the beam revival procedure in response to receiving a BFRR response from the base unit and re-starting communication with the base unit using a new active beam in response to the BFRR response, wherein the new active beam is associated with the received BFRR response. In certain embodiments, a downlink reference signal of the new active beam is quasi-co-located with a DM-RS of a PDCCH, wherein the PDCCH includes scheduling information for the BFRR response. In certain embodiments, the new active beam is indicated in the BFRR response. In some embodiments, the first set of beams is an active set of beams, and the user terminal is further configured with a second set of beams used for beam failure recovery.

In some embodiments, initiating the beam revival procedure in parallel with a beam recovery procedure includes determining a resource for transmitting the BFRR, transmitting the BFRR on the determined resource, and monitoring for a BFRR response, if the beam revival procedure is not successful for at least one beam in the first set. In such embodiments, terminating the beam recovery procedure includes stopping the monitoring for a BFRR response. In certain embodiments, detecting beam failure for each beam in the first set of beams is based on measurements on one or more beam failure detection reference signals, wherein the beam revival procedure includes monitoring the one or more beam failure detection reference signals until an RLF timer expires.

In various embodiments, the first method includes receiving a configuration for the beam revival procedure, wherein the configuration for the beam revival procedure indicates at least one of: a first number of consecutive beam revival instances, a RSRP threshold value, and a BLER threshold value. In one embodiment, the beam revival procedure is determined to be successful for an active beam of the first set in response to a RSRP measurement value of the active beam being above the configured RSRP threshold value for the first number of consecutive beam revival instances. In another embodiment, the beam revival procedure is determined to be successful for an active beam of the first set in response to a hypothetical BLER of the active beam being above the configured BLER threshold value for the first number of consecutive beam revival instances. In certain embodiments, the beam revival procedure is determined to be successful for an active beam of the first set in response to a PDCCH being successfully decoded, wherein a DM-RS of the PDCCH is quasi-co-located with a beam failure detection reference signal of the active beam.

In some embodiments, the first method includes identifying a new beam using a set of candidate beam reference signals and determining a resource for transmitting the BFRR based on the identified new beam. In certain embodiments, terminating the beam recovery procedure includes stopping transmission of the BFRR in response to the beam revival procedure being successful for at least one beam of the first set of beams. In certain embodiments, the first method includes releasing a grant-free or SPS allocation in response to detecting beam failure for all beams of the first set of beams. In some embodiments, the first method includes Sending an In-Sync indication for RLM to a higher layer in response to the beam revival procedure being successful for at least one beam of the first set and Sending an Out-of-Sync indication for RLM to the higher layer in response to detecting beam failure for each beam of the first set.

In various embodiments, transmitting the BFRR includes transmitting a contention-based random-access preamble. In certain embodiments, the first method includes receiving a Backoff MAC subheader is received in a Random-Access Response message, the Random-Access Response message being a response to the contention-based random-access preamble and not applying a random Backoff for transmitting the BFRR. In one embodiment, the contention-based random-access preamble is part of a four-step random-access procedure, wherein a third message of the four-step random-access procedure includes a medium access control MAC CE including a bitmap with each bit of the bitmap indicating a corresponding beam identity. In another embodiment, the contention-based random-access preamble is part of a two-step random-access procedure. Here, a first message of the two-step random-access procedure includes a PRACH preamble and PRACH data, wherein the PRACH data includes at least a UE identity and is transmitted according to an uplink timing advance value calculated based on a receive timing difference between an active beam of the first set and a newly found beam.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   communicating with a base unit using a first set of beams;
   detecting beam failure for each beam in the first set of beams;
   initiating a beam revival procedure for the first set of beams, wherein the beam revival procedure comprises monitoring a beam quality of the first set of beams, wherein the beam revival procedure is successful when any beam of the first set of beams improves beyond a threshold beam quality for at least a threshold amount of time;
   initiating a beam recovery procedure in parallel with the beam revival procedure, wherein the beam recovery procedure comprises transmitting a beam failure recovery request ("BFRR");
   terminating the beam recovery procedure in response to successful beam revival of at least one beam in the first set and prior to receiving a BFRR response from the base unit; and
   re-starting communication with the base unit using the first set of beams in response to successful beam revival of at least one beam in the first set.

2. The method of claim 1, further comprising:
   terminating the beam revival procedure in response to receiving the BFRR response from the base unit; and
   re-starting communication with the base unit using a new active beam in response to the BFRR response, wherein the new active beam is associated with the received BFRR response.

3. The method of claim 1, wherein initiating the beam revival procedure in parallel with a beam recovery procedure comprises:
   determining a resource for transmitting the BFRR;
   transmitting the BFRR on the determined resource; and
   monitoring for the BFRR response, if the beam revival procedure is not successful at least one beam in the first set,
   wherein terminating the beam recovery procedure comprises stopping the monitoring for the BFRR response.

4. The method of claim 1, wherein detecting beam failure for each beam in the first set of beams is based on measurements on one or more beam failure detection reference signals, wherein the beam revival procedure comprises monitoring the one or more beam failure detection reference signals until a radio link failure ("RLF") timer expires.

5. The method of claim 1, further comprising receiving a configuration for the beam revival procedure, wherein the configuration for the beam revival procedure indicates at least one of: a first number of consecutive beam revival instances, a reference signal received power ("RSRP") threshold value, and a block error rate ("BLER") threshold value.

6. The method of claim 5, wherein the beam revival procedure is determined to be successful for an active beam of the first set in response to a RSRP measurement value of the active beam being above a configured RSRP threshold value for the first number of consecutive beam revival instances.

7. The method of claim 5, wherein the beam revival procedure is determined to be successful for an active beam of the first set in response to a hypothetical BLER of the active beam being above a configured BLER threshold value for the first number of consecutive beam revival instances.

8. The method of claim 5, wherein the beam revival procedure is determined to be successful for an active beam of the first set in response to a physical downlink control channel ("PDCCH") being successfully decoded, wherein a demodulation reference signal of the PDCCH is quasi-co-located with a beam failure detection reference signal of the active beam.

9. The method of claim 1, further comprising:
   identifying a new beam using a set of candidate beam reference signals, and
   determining a resource for transmitting the BFRR based on the identified new beam.

10. The method of claim 1, wherein terminating the beam recovery procedure comprises stopping transmission of the BFRR in response to the beam revival procedure being successful for at least one beam of the first set of beams.

11. The method of claim 1, further comprising releasing a grant-free or SPS allocation if detecting beam failure for all beams of the first set of beams.

12. The method of claim 1, further comprising:
   sending an In-Sync indication for radio link monitoring ("RLM") to a higher layer in response to the beam revival procedure being successful for at least one beam of the first set, and
   sending an Out-of-Sync indication for RLM to the higher layer in response to detecting beam failure for each beam of the first set.

13. The method of claim 1, wherein transmitting the BFRR comprises transmitting a contention-based random-access preamble.

14. The method of claim 13, further comprising:
   receiving a Backoff medium access control ("MAC") subheader in a Random-Access Response message, the Random-Access Response message being a response to the contention-based random-access preamble; and
   not applying a random Backoff for transmitting the BFRR.

15. The method of claim 13, wherein the contention-based random-access preamble is a first message of a four-step random-access procedure, wherein a third message of the four-step random-access procedure comprises a medium access control ("MAC") control element ("CE") including a bitmap with each bit of the bitmap indicating a corresponding beam identity.

16. The method of claim 13, wherein the contention-based random-access preamble is a first message of a two-step random-access procedure and comprises a physical random access channel ("PRACH") preamble and PRACH data, wherein the PRACH data includes at least a user equipment ("UE") identity and is transmitted according to an uplink timing advance value calculated based on a receive timing difference between an active beam of the first set of beams and a newly found beam.

17. An apparatus comprising:
a transceiver that communicates with a base unit using a first set of beams; and
a processor that:
detects beam failure for each beam in the first set of beams;
initiates a beam revival procedure for the first set of beams, wherein the beam revival procedure comprises monitoring a beam quality of the first set of beams, wherein the beam revival procedure is successful when any beam of the first set of beams improves beyond a threshold beam quality for at least a threshold amount of time;
initiates a beam recovery procedure in parallel with the beam revival procedure, wherein the beam recovery procedure comprises transmitting a beam failure recovery request ("BFRR");
terminates the beam recovery procedure in response to successful beam revival of at least one beam in the first set and prior to receiving a BFRR response from the base unit; and
re-starts communication with the base unit using the first set of beams in response to successful beam revival of at least one beam in the first set.

18. The apparatus of claim 17, wherein the processor further:
terminates the beam revival procedure in response to receiving the BFRR response from the base unit; and
re-starts communication with the base unit using a new active beam in response to the BFRR response, wherein the new active beam is associated with the received BFRR response.

19. The apparatus of claim 17, wherein initiating the beam revival procedure in parallel with the beam recovery procedure comprises:
determining a resource for transmitting the BFRR;
transmitting the BFRR on the determined resource; and
monitoring for the BFRR response, if the beam revival procedure is not successful at least one beam in the first set,
wherein terminating the beam recovery procedure comprises stopping the monitoring for the BFRR response.

20. The apparatus of claim 17, wherein terminating the beam recovery procedure comprises stopping transmission of the BFRR in response to the beam revival procedure being successful for at least one beam of the first set of beams.

* * * * *